United States Patent
Ishiwatari

(12) 
(10) Patent No.: US 6,201,788 B1
(45) Date of Patent: Mar. 13, 2001

(54) TRANSMISSION DEVICE AND SYSTEM HAVING THE SAME

(75) Inventor: Junichi Ishiwatari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/985,686

(22) Filed: Dec. 5, 1997

(30) Foreign Application Priority Data

May 12, 1997 (JP) .................................................. 9-121001

(51) Int. Cl.[7] ................................................. G01R 31/08
(52) U.S. Cl. ......................... 370/228; 370/537; 370/907; 359/119; 714/4
(58) Field of Search ..................................... 370/221–228, 370/907, 537–540, 248, 249, 250, 242–244, 404, 464, 476, 498; 359/118, 119; 709/226, 251, 249; 714/1, 2, 4

(56) References Cited

U.S. PATENT DOCUMENTS

| | | | | |
|---|---|---|---|---|
| 5,412,652 | * | 5/1995 | Lu ......................................... | 370/223 |
| 5,721,727 | * | 2/1998 | Ashi et al. ........................... | 370/244 |
| 5,745,476 | * | 4/1998 | Chudhuri ............................. | 370/222 |
| 5,790,520 | * | 8/1998 | Iwamoto et al. .................... | 370/223 |
| 5,815,490 | * | 9/1998 | Lu ......................................... | 370/223 |
| 5,844,889 | * | 12/1998 | Takatsu et al. ...................... | 370/223 |

* cited by examiner

Primary Examiner—Seema S. Rao
(74) Attorney, Agent, or Firm—Helfgott & Karas, P.C.

(57) ABSTRACT

A transmission device includes a channel allocation part which groups channels defined on a transmission line into groups and allocate, for each of the groups, the channels in one of predetermined transmission modes which can be defined on a dual link formation of a network to which the transmission device can be connected.

14 Claims, 18 Drawing Sheets

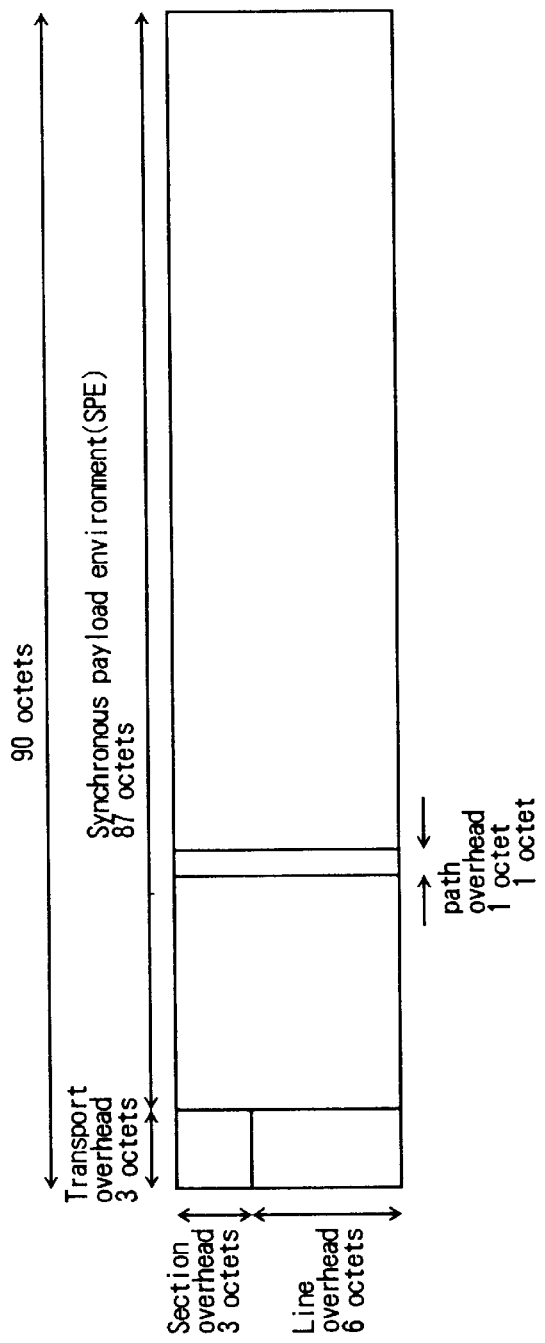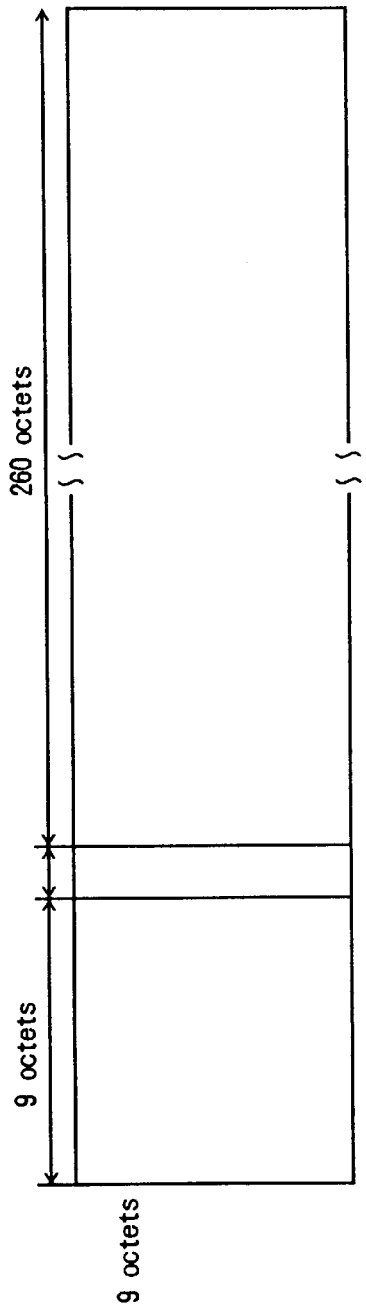

FIG. 3A PRIOR ART

| | | | |
|---|---|---|---|
| Section overhead | Framing A1 | Framing A2 | STS-ID C1 |
| | BIP-8 B1 | Orderwite E1 | User F1 |
| | Data Com D1 | Data Com D2 | Data Com D3 |
| Line overhead | Pointer H1 | Pointer H2 | Pointer H3 |
| | BIP-8 B2 | APS K1 | APS K2 |
| | Data Com D4 | Data Com D5 | Data Com D6 |
| | Data Com D7 | Data Com D8 | Data Com D9 |
| | Data Com D10 | Data Com D11 | Data Com D12 |
| | Growth Z1 | Growth Z2 | Orderwite E2 |

FIG. 3B PRIOR ART

| |
|---|
| Trace J1 |
| BIP-8 B3 |
| Signal label C2 |
| Path status G1 |
| User F2 |
| Multiframe H4 |
| Growth Z3 |
| Growth Z4 |
| Growth Z5 |

TRANSMISSION DEVICE AND SYSTEM HAVING THE SAME

BACKGROUND OF THE INVENTION

1. Field of the Invention

The present invention generally relates to a transmission device and a communication system, and more particularly to an optical communication system employing a synchronous digital hierarchy and a transmission device suitable for such an optical communication system.

An optical communication network has been practically used as means for providing broadband services in which a variety of data on telephone, facsimile, images and so on is integrated. The user/network interface in the optical communication network has been internationally standardized, and is known as a Synchronous Digital Hierarchy (SDH), as defined in the CCITT recommendations G707, G708 and G709, the disclosure of which is hereby incorporated by reference. A network which conforms to the SDH has been practically used as SONET (Synchronous Optical NETwork) in the North America.

2. Description of the Prior Art

First, a description will be briefly given of the SONET. The SONET is described in, for example, William Stallings, "ISDN and Broadband ISDN, Macmillan Publishing Company, 1992, pp. 546–558.

In the SONET, a multiplexed optical carrier (OC) is transmitted. The transmission device converts the optical signal (carrier) into an electric signal and vice versa. The electric signal is called a synchronous transport signal (STS). The basic bit rate of the SONET is 51.84 Mbps. The optical carrier having the above basic bit rate is expressed as OC-1. Generally, an optical carrier or signal is expressed as OC-N where N (optical carrier level N) is an integer, and a corresponding electric signal is expressed as STS-N (synchronous transport carrier level N). For example, the optical carrier OC-12 is an optical carrier or signal having a bit rate of 622.080 Mbps (=12×51.84 Mbps). In the SONET, signals having bit rates which are integer multiples of the basic bit rate. The optical carrier OC-12 is obtained by multiplexing 12 STS-1 signals at the byte level to thereby generate an STS-12 signal and by converting the STS-12 signal into an optical signal. Generally, the multiplexing of STS-N signals employs a byte-level interleave process.

It will be noted that the STS-3 in the SONET corresponds to a synchronous transport module STM-1 in the SDH. Similarly, the STS-12 corresponds to the STM-4.

The signal STS can be obtained by, for example, sequentially multiplexing digital signals having lower bit rates, such as DS-0 (64 Kbps), DS-1 (1.5 Mbps), DS-2 (6.3 Mbps) and DS-3 (45 Mbps).

FIG. 1 is a block diagram showing the outline of a network of the SONET. Electric signals from terminals 1 and 2 are respectively multiplexed by transmission devices 3 and 7, and resultant multiplexed signals are converted into light signals, which are then sent to transmission paths 8 formed of optical fiber cables. Repeaters 4, 5 and 6 are provided in the transmission paths 8. Particularly, the repeater 5 has a function of terminating the optical signals (the above function is called an add/drop function). As shown in FIG. 1, terms "section", "line" and "path" are defined in the SONET. The section corresponds to an optical transmission part between transmission devices, between repeaters or between a transmission device and a repeater. The line corresponds to an optical transmission part between transmission devices, between repeaters or between a transmission device and a repeater, each having the terminating function. The path indicates the end-to-end optical transmission part.

FIG. 2A is a diagram showing the frame format of the signal STS-1. As shown in FIG. 2A, the signal STS-1 consists of 810 octets, and is transferred every 125 μs. The 810 octets consists of nine rows arranged in a matrix formation, each of the rows consisting of 90 octets. In other words, the signal STS-1 has a 9×9 matrix formation. The first three columns (three octets×nine rows) forms an overhead in which a variety of control information concerning transmissions. The first three rows of the overhead forms a section overhead, and the remaining six rows forms a line overhead. The control information forming the overheads is also referred to as overhead information.

FIG. 2B is a diagram showing the frame format of the signal STS-3. In the SDH, a new format is not created during the hierarchically multiplexing operation. That is, the signal STS-3 can be formed by simply byte-multiplexing the signals STS-1 including the headers thereof without forming a new header specifically directed to the signal STS-3.

FIG. 3A shows the section overhead and the line overhead, and FIG. 3B shows the path overhead. The bytes forming these overheads are well known, and a description thereof will be omitted here.

FIG. 4 is a block diagram of a practical SONET system. Transmission devices 10A, 10B, 10C and 10D, each capable of operating at a highest bit rate, are connected in a dual loop (ring) formation by means of optical fiber cables $11_1$ and $11_2$. The dual loop formation facilitates to the flexibility and expansibility of constructing the system. As will be described later, reference numbers 20A–20D indicate transmission devices according to the present invention.

A transmission device having a bit rate equal to or lower than that of the highest bit rate can be connected to each of the transmission devices 10A–10D. In the case of FIG. 4, transmission devices 12a, 12b, 12c, 12d, . . . , each having a bit rate lower than that of the transmission device 10A are connected to the transmission device 10A. The transmission device 10A multiplexes signals sent by the transmission devices 12a–12d and receives via optical fiber cables 13a, 13b, 13c and 13d, and sends a multiplexed optical signal to either the transmission device 10B and 10D or both thereof. In FIG. 4, for the convenience sake, one of two input/output sides of each of the transmission devices 10A–10D is called an east side, and the other side is called a west side. For example, the transmission device 10D is located at the east side of the transmission device 10A, and the transmission device 10B is located at the west side thereof.

Although not shown in FIG. 4, transmission devices having a bit rate lower than those of the transmission devices 12a–12d can be connected thereto by optical fiber cables or electrically conductive cables. Signals from terminals such as telephone sets, facsimile machines and personal computers are multiplexed in accordance with a given hierarchy, and multiplexed optical signals are transferred via the transmission devices 10A–10D. In practice, the transmission devices 10B and 10D, for example, may be regenerators (repeater devices).

As shown in FIG. 5, a network can be constructed by combining a plurality of loops. In FIG. 5, transmission devices 10E and 10F form a loop together with the transmission devices 10A and 10D.

The hierarchy employed when the transmission devices 10A–10D transmit OC-48 light signals is as shown in FIG.

6. Each of the transmission devices 10A–10D transmits an OC-48 light signal, which corresponds to an STS-48 electric signal having 48 multiplexed channels. The OC-48 light signal can be produced by, for example, multiplexing four OC-12 light signals from the transmission device 12a or the like. Each OC-12 light signal can be produced by multiplexing four OC-3 light signals from a transmission device (not shown in FIG. 1) having a lower bit rate.

FIG. 7 shows a hierarchy employed when the transmission devices 10A–10D transmit OC-192 light signals. The OC-192 light signal can be produced by multiplexing four OC-48 signals, which can be produced by multiplexing four OC-12 signals, which can be produced by multiplexing four OC-3 signals. The hierarchy shown in FIG. 7 enables a frame structure called a concatenated STS-N signal (expressed as STS-Mc). In FIG. 7, a STS signal having three channels and corresponding to the OC-3 light signal, that is, an STS-3C signal is processed as one signal and is subjected to a given process such as a multiplexing process. An STS signal having 12 channels and corresponding to the OC-12 light signal is processed as one signal and is subjected to the multiplexing process and so on.

Two transmission methods or protocols applied to the dual ring formation connecting the transmission devices 10A–10D are known. One transmission method is a unidirectional path switched ring method (hereinafter referred to as a UPSR method), and the other transmission method is a bi-directional line switched ring method (hereinafter, BLSR method). In the UPSR method, each of the transmission devices 10a–10d sends an identical light signal to both the east side and the west side.

As shown in FIG. 8, in the UPSR method, the transmission device 10C, for example, sends the identical light signals to the transmission devices 10B and 10D. In this case, one of the two direction forms the working system, and the other direction forms the protection or spare system. The UPSR system is suitable for a case where it is required to distribute the identical signals to nodes (transmission devices). The transmission device 10A receives the identical light signals, and selects one of these signals. The selected light signal is sent to, for example, a transmission device operating at a bit rate lower than that of the transmission device. The above operation is carried out in a normal state. If a fault such as a braking of the optical fiber cable provided between the transmission devices 10A and 10B occurs, an alarm indication signal (AIS) is sent to the following transmission device, and the path is switched to the direction in which there is no alarm indication signal. In the above case, the transmission device 10A selects the light signal coming from the transmission device 10D. Since the identical light signals are sent in the two direction, the number of available channels in each of the optical fiber cables $11_1$ and $11_2$ coincides with the transmission capacity thereof (for example, 48 channels for OC-48).

In the BLSR system, the light signal is sent in only one direction irrespective of whether a fault occurs. For example, the channels can be used for any of transmissions carried out between the transmission devices 10A and 10C, transmissions carried out between the transmission devices 10C and 10B and transmissions carried out between the transmission devices 10C and 10D. Hence, the BLSR method has a transmission capacity per channel which is equal to three times that obtained in the UPSR system. However, in practice, it is required to provide protection channels, the transmission capacity per channel in the BLSR is not as large as the above, and a redundant configuration is employed. For example, in the OC-48 signal, 24 channels are used as working channels, and the remaining 24 channels are used as protection channels. In this case, a transmission capacity equal to 72 channels (24×3 channels) is available. In this case, the transmission capacity in the BLSR system is 1.5 times as large as that obtained in the UPSR method.

When a fault occurs in the BLSR system, the following procedure is carried out. Referring to FIG. 9A, data is transferred from the transmission device 10C to the transmission device 10A via the transmission device 10D. It will now be assumed that a fault occurs in the optical fiber cable $11_1$ between the transmission devices 10A and 10D. When the transmission device 10A receives the aforementioned alarm indication signal indicative of occurrence of a fault, the transmission device 10A recognizes the occurrence of a fault, and informs the transmission devices 10B, 10C and 10D of the occurrence of a fault by means of given information, which is an automatic protection switch (APS) including K1 and K2 bytes shown in FIG. 3A.

Upon receiving the APS information, as shown in FIG. 9B, the transmission device 10D makes a loop-back formation for the working channels in the optical fiber cable $11_1$ via which the light signal from the transmission device 10C is received so that the above work channels are coupled to the protection channels of the optical fiber cable $11_2$ via which the light signal is sent to the transmission device 10C. Further, the transmission devices 10C and 10B form through-lines from the transmission device 10D to the transmission device 10A. Further, the transmission device which detects the fault makes a loop-back formation for the optical fiber cable $11_2$ extending from the transmission device 10B so that the protection channels of the cable $11_2$ are coupled to the working channels of the optical fiber cable $11_1$ extending from the transmission device 10D. Hence, the light signal can be recognized as if it is transmitted over the optical fiber cable $11_1$ having a fault. As described above, the BLSR method can efficiently utilize the channels to realize node-to-node communications.

It can be seen from the above description that the channel allocation employed in the UPSR method is quite different from that employed in the BLSR method. Thus, the two methods require respective fault recovery protocols.

Conventionally, the optical communication system is designed and constructed in conformity with either the UPSR method or the BLSR method. Hence, the transmission devices 10A–10F has the channel allocating function based on either the UPSR method or the BLSR method. That is, the transmission devices based on the UPSR method requires the configuration of selecting one of the two light signals, that is, the path switch. The transmission devices based on the BLSR method requires the configuration of enabling the loop-back formation.

However, the above prior art has the following disadvantages. The prior art does not flexibly satisfy various user's demands. For example, if it is required to change a transmission path including transmission devices based on the UPSR method to that based on the BLSR method, all the transmission devices should be exchanged by those based on the BLSR method. This is troublesome and expensive. In other words, the prior art cannot provide a system in which the UPSR method and the BLSR method coexist.

SUMMARY OF THE INVENTION

It is a general object of the present invention to provide a transmission device and a system in which the above disadvantages are eliminated.

A more specific object of the present invention is to provide a transmission device and a system in which different transmission methods or protocols can coexist, so that a flexible and expansible system can be constructed.

The above objects of the present invention are achieved by a transmission device comprising: a channel allocation part which groups channels defined on a transmission line into groups and allocate, for each of the groups, the channels in one of predetermined transmission modes which can be defined on a dual link formation of a network to which the transmission device can be connected.

The transmission device may be configured so that the channel allocation part comprises channel allocation units respectively provided to N/n where N is a total transmission capacity given by the channels, and n is an integer equal to or less than N.

The transmission device may be configured so that the channel allocation part comprises, for each of the groups, at least one of first and second allocation parts respectively suitable for the transmission modes.

The transmission device may be configured so that: the first allocation part allocates the channels so that identical signals can be sent in two directions; and the second allocation part allocates the channels so that signals having a redundant channel arrangement can be sent in two directions.

The transmission device may be configured so that: the channel allocation part comprises, for each of the groups, one of first and second allocation parts respectively suitable for the transmission modes; and the transmission device comprises a control part which controls the above one of the first and second allocation parts to avoid a fault which occurs in the network.

The transmission device may be configured so that: a signal transferred over the transmission line having a transmission capacity N is a multiplexed signal obtained by multiplexing N/n signals, each of which signals has a capacity n; and the channel allocation part comprises channel allocation units respectively provided to N/n.

The transmission device may be configured so that: the N corresponds to a level N of a STS-N signal defined in a SONET; the n corresponds to a level n of a STS-n signal defined in the SONET; the STS-N signal corresponds to the signal transferred over the transmission line; and the STS-n signal corresponds to one of the N/n signals.

The transmission device may be configured so that the STS-N signal is a concatenated signal obtained by concatenating a plurality of STS-n signals.

The above objects of the present invention are also achieved by a system comprising: a plurality of transmission devices connected in a ring formation; one of the plurality of transmission devices comprising a channel allocation part which groups channels defined on a transmission line into groups and allocate, for each of the groups, the channels in one of predetermined transmission modes which can be defined on a dual link formation of a network to which the transmission device can be connected.

BRIEF DESCRIPTION OF THE DRAWINGS

Other objects, features and advantages of the present invention will become more apparent from the following detailed description when read in conjunction with the accompanying drawings, in which:

FIGS. 2A and 2B are diagrams of formats employed in the SONET;

FIGS. 3A and 3B are diagrams of overheads of a signal used in the SONET;

DESCRIPTION OF THE PREFERRED EMBODIMENTS

Figure 10:
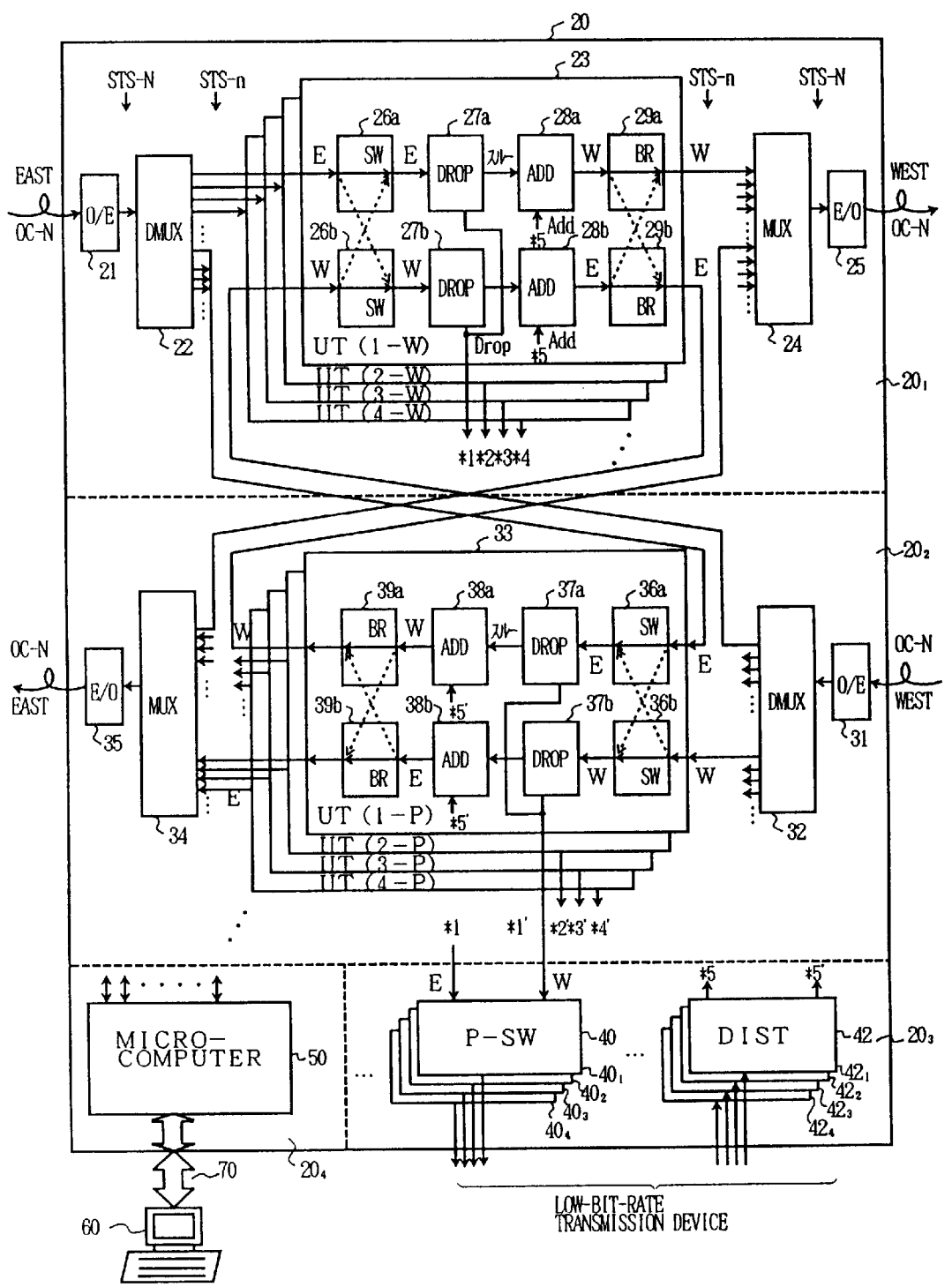
FIG. 10 is a block diagram of a transmission device according to an embodiment of the present invention.

FIG. 10 is a block diagram of a transmission device 20 according to an embodiment of the present invention. The transmission device 20 can be replaced by any of the previously described transmission devices 10A–10F.

The transmission device 20 includes a working system $20_1$, a protection system $20_2$, a low-bit-rate interface $20_3$ and a control system $20_4$. The working system $20_1$ is the same structure as the protection system $20_2$. The working system $20_1$ and the protection system $20_2$ are connected to respective optical fiber cables which extend in the east and west directions. The working system $20_1$ includes an optical-electric (O/E) converting part 21, a demultiplexer (DMUX) 22, a signal processing part 23, a multiplexer (MUX) 24 and an electric-optical (E/O) converting part 25. The signal processing part 23 performs a termination process and a loop-back process, which processes will be described later.

Similarly, the protection system $20_2$ includes an optical-electric (O/E) converting part 31, a demultiplexer (DMUX) 32, a signal processing part 33, a multiplexer (MUX) 34 and an electric-optical (E/O) converter 35. The signal processing part 33 performs a termination process and a loop-back process, which will be described later.

The low-bit-rate interface $20_3$ includes a path switch part 40 and a distributing part (DIST) 42. The path switch part 40 selects one of the two identical signals sent along the east and west directions, and outputs the selected signal to low-bit-rate transmission devices. The distributing part 42 outputs light signals from the low-bit-rate transmission devices to the working system $20_1$ and the protection system $20_2$.

The control system $20_4$ controls the whole transmission device 20, and can be formed by, a microcomputer 50. The microcomputer 50 is connected to a control part 60 provided outside of the transmission device 20, and controls the parts of the transmission device 20 under the control of the control part 60. The control part 60 is commonly provided to the transmission devices (which are, for example, the transmission devices 20A–20D shown in FIG. 4), and is connected thereto by means of transmission media which are different from the optical fiber cables for data transmissions. The microcomputer 50 generates clock signals necessary for the operations of the parts of the transmission device 20 on the basis of timing signals extracted from the signals received by the demultiplexers 22 an 32.

In order to realize the coexistence of the UPSR and BLSR methods, according to the present invention, N/n is defined where N denotes the level N of the OC-N light signal (STS-N) corresponding to the number of channels or transmission capacity, and n is a dividing unit. For example, when N=192 and n=48, then N/n is equal to 4. By dividing the transmission capacity N by n, it becomes possible to divide the STS-N electric signal corresponding to the OC-N light signal into N/n signals each having n channels and to make, for each of the divided signals, a selection of either the UPSR method or the BLSR method. Hereinafter, the N/n signals obtained by dividing STS-N will be denoted as STS-n. That is, the channels (N channels) on the transmission path are grouped into a plurality of N/n groups, each of which groups has n channels.

In order to process the STS-n signal for each of the N/n groups, the signal processing part 23 of the working system $20_1$, the signal processing part 33 of the protection system $20_2$, and the path switch part 40 and the distributing part 42 of the low-bit-rate interface $20_3$ are respectively divided into N/n groups, each of which groups is arranged in a unit formation. That is, one unit is formed of one group. Each of the units can operate independently of each other. In other words, the channels can be independently processed for each of the groups or units.

More particularly, the signal processing part 23 includes N/n units. In FIG. 10, the signal processing part 23 includes four units UT(1-W), UT(2-W), UT(3-W) and UT(4-W). Similarly, the signal processing part 33 includes N/n units, and has, in FIG. 10, four units UT(1-P), UT(2-P), UT(3-P) and UT(4-P). The path switch part 40 includes N/n units, and has, in FIG. 10, four units $40_1$, $40_2$, $40_3$ and $40_4$. The path switch 42 includes N/n units, and has, in FIG. 10, four units $42_1$, $42_2$, $42_3$ and $42_4$. By dividing N/n, it is possible to determine either the UPSR method or the BLSR method for each of N/n.

Figure 11:
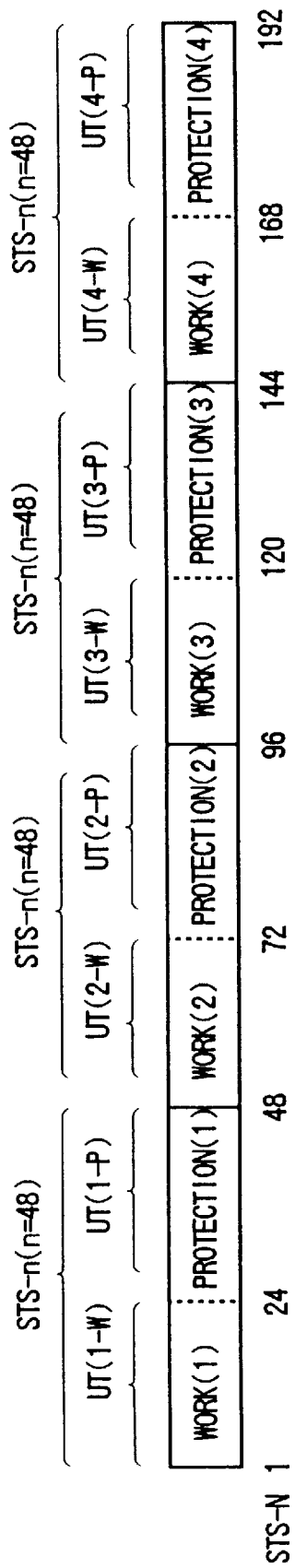
FIG. 11 is a diagram of a format of a signal processed by the transmission device shown in FIG. 10.

The following description will assume that N=192 and n=48 (thus, N/n=4). Referring to FIG. 11, 192 channels of the OC-192 signal are grouped into four groups. Each of the four groups includes 48 channels, which are channels of the STS-48 in the notification STS-n. Hereinafter, STS-48(n) is defined in order to clearly describe that is obtained by dividing 192 channels of the STS-192 signal are grouped every 48. Each of the four STS-48(n) signals has 48 channels, and 24 channels among the 48 channels are allocated to the working channels, the remaining 24 channels being allocated to the protection channels. The 24 working channels consisting of channel #1–channel #24 are processed by the unit UT(1-W) shown in FIG. 10, and the 24 protection channels consisting of channel #25–channel #48 are processed by the unit UT(1-P) shown in FIG. 10. Similarly, the channels of each of the STS-n signals are processed by the respective units.

A further description will be given of the structure shown in FIG. 10.

The optical-electric converting part 21 converts the OC-192 light signal transmitted over the optical fiber cable on the east side into the STS-192 electric signal, which is then output to the demultiplexer 22. As shown in FIG. 11, the demultiplexer 22 divides the STS-192 signal into four groups, so that two sets, each consisting of four STS-48(n) signals, can be produced. One of the two sets of STS-48(n) signals is supplied to the signal processing part 23, and the remaining set is supplied to the signal processing part 33. The four STS-48(n) signals supplied to the signal processing part 23 are respectively supplied to the units UT(1-W), UT(2-W), UT(3-W) and UT(4-W). The four STS-48(n) signals supplied to the signal processing part 33 are respectively supplied to the units UT(1-P), UT(2-P), UT(3-P) and UT(4-P). The demultiplexer 23 extracts the timing signal from the received STS-192 signal, and sends it to the microcomputer 50. Further, the demultiplexer 22 receives an instruction from the microcomputer 50, and extracts necessary information from the received signal at respective timings. The extracted information is sent to the microcomputer 50.

Similarly, the optical-electric converting part 31 converts the OC-192 light signal transmitted over the optical fiber cable on the west side into the STS-192 electric signal, which is then output to the demultiplexer 32. As shown in FIG. 11, the demultiplexer 32 divides the STS-192 signal into four groups, so that two sets, each consisting of four STS-48(n) signals, can be produced. One of the two sets of STS-48(n) signals is supplied to the signal processing part 33, and the remaining set is supplied to the signal processing part 23. The four STS-48(n) signals supplied to the signal processing part 33 are respectively supplied to the units UT(1-P), UT(2-P), UT(3-P) and UT(4-P). The four STS-48(n) signals supplied to the signal processing part 23 are respectively supplied to the units UT(1-W), UT(2-W), UT(3-W) and UT(4-W). The demultiplexer 32 extracts the timing signal from the received STS-192 signal, and sends it to the microcomputer 50. Further, the demultiplexer 32 receives an instruction from the microcomputer 50, and extracts necessary information from the received signal at respective timings. The extracted information is sent to the microcomputer 50.

The switch part 26a of the working system $20_1$ outputs the STS-48(n) signal from the east side to the extracting part 27a located on the east side, or switches it to the extracting part 27b located on the west side. Similarly, the switch part 26b outputs the STS-48(n) signal from the west side to the extracting part 27b located on the west side, or switches it to the extracting part 27a located on the east side. The switch parts 26a and 26b are controlled by the microcomputer 50.

The extracting parts 27a and 27b are capable of extracting the channels from the STS-48(n) signal for every STS-1 unit (N=1; 51.84 Mbps) by a known time slot assignment process. For example, the UPSR method is specified to the unit UT(1-W), the extracting part 27a outputs all the channels of the received STS-48(n) signal to the east-side input of the corresponding unit $40_1$ of the path switch part 40. This process is indicated by symbol *1 shown in FIG. 10. By the above process, 48 channels are set to 48 channels on the extracting side. The extracting part 27b operates in the same manner as described above.

If the BLSR method is specified and there is no fault (normal operating state), the extracting part 27a extracts only working channels #1–#24 from the received STS-48(n) signal, and outputs the extracted channels to the east-side input of the unit $40_1$. In this case, working channels #1–#24 are set to channels #1–#24 arranged on the extracting side.

Further, the extracting part 27b extracts only working channels #1–#24 from the received STS-48(n) signal, and outputs the extracted channels to the east-side input of the unit $40_1$. In this case, working channels #1–#24 are set to channels #25–#48 arranged on the extracting side.

Similarly, the signals extracted in the units UT(2-W), UT(3-W) and UT(4-W) are respectively output to the units $40_2$, $40_3$ and $40_4$. The extracting parts 27a and 27b can allow the received STS-48(n) signals to pass therethrough.

The inserting parts 28a and 28b insert signals sent by low-bit-rate transmission devices and received via the corresponding units of the distributing part 42 into the signals receives by the extracting units 27a and 27b in accordance with the known time slot assignment process. For example, the unit $42_1$ corresponds to the unit UT(1-W). The signal received by low-bit-rate transmission device connected to the unit $42_1$ are commonly supplied, as signal *5, to the inserting parts 28a and 28b. The other units $42_2$, $42_3$ and $42_4$ operate in the same manner as described above.

The bridge part 29a outputs the signal output by the inserting part 28a to the multiplexer 24 as a signal to be sent in the west direction or to the multiplexer 34 of the protection system $20_2$ as a signal to be sent in the east direction. Similarly, the bridge part 29b outputs the signal output by the inserting part 28b to the multiplexer 34 as a signal to be sent in the east direction or to the multiplexer 24 of the working system $20_1$ as a signal to be sent in the west direction. The operations of the switch parts 29a and 29b are controlled by the microcomputer 50.

The multiplexer 24 receives the signals from the units UT(1-W), UT(2-W), UT(3-W) and UT(4-W) of the signal processing part 23 of the working system $20_1$, and the signals from the units UT(1-P), UT(2-P), UT(3-P) and UT(4-P) of the signal processing part 33 of the protection system $20_2$. Then, the multiplexer 24 multiplexes the received signals and outputs a multiplexed signal to the electric-optical converting part 25. The multiplexed signal is the STS-192 signal, which is converted into the OC-192 signal by the part 25. Finally, the OC-192 signal is output to the optical fiber cable located on the west side.

The structure of the protection system $20_2$ is the same as that of the working system $20_1$ described above, and a description thereof will be omitted here. It should be noted that the signals extracted by the extracting parts 37a and 37b are output to west-side inputs of the corresponding units of the path switch part 40. For example, the output signals of the extracting parts 37a and 37b of the unit UT(1-P) are output to the west-side input of the unit $40_1$ as indicated by *1'–*4' shown in FIG. 10.

Figure 1:
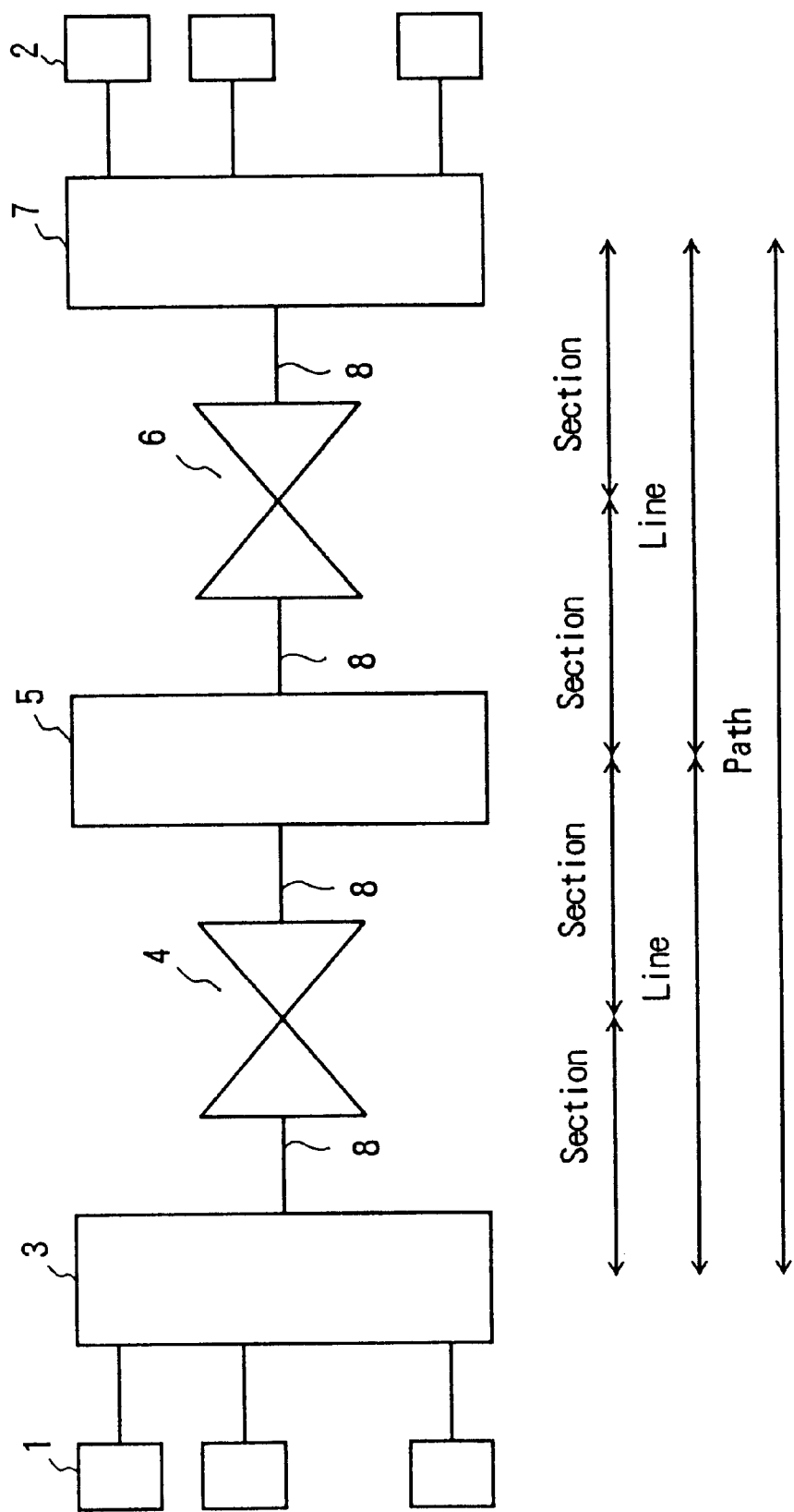
FIG. 1 is a block diagram of an outline of a SONET.
Figure 4:
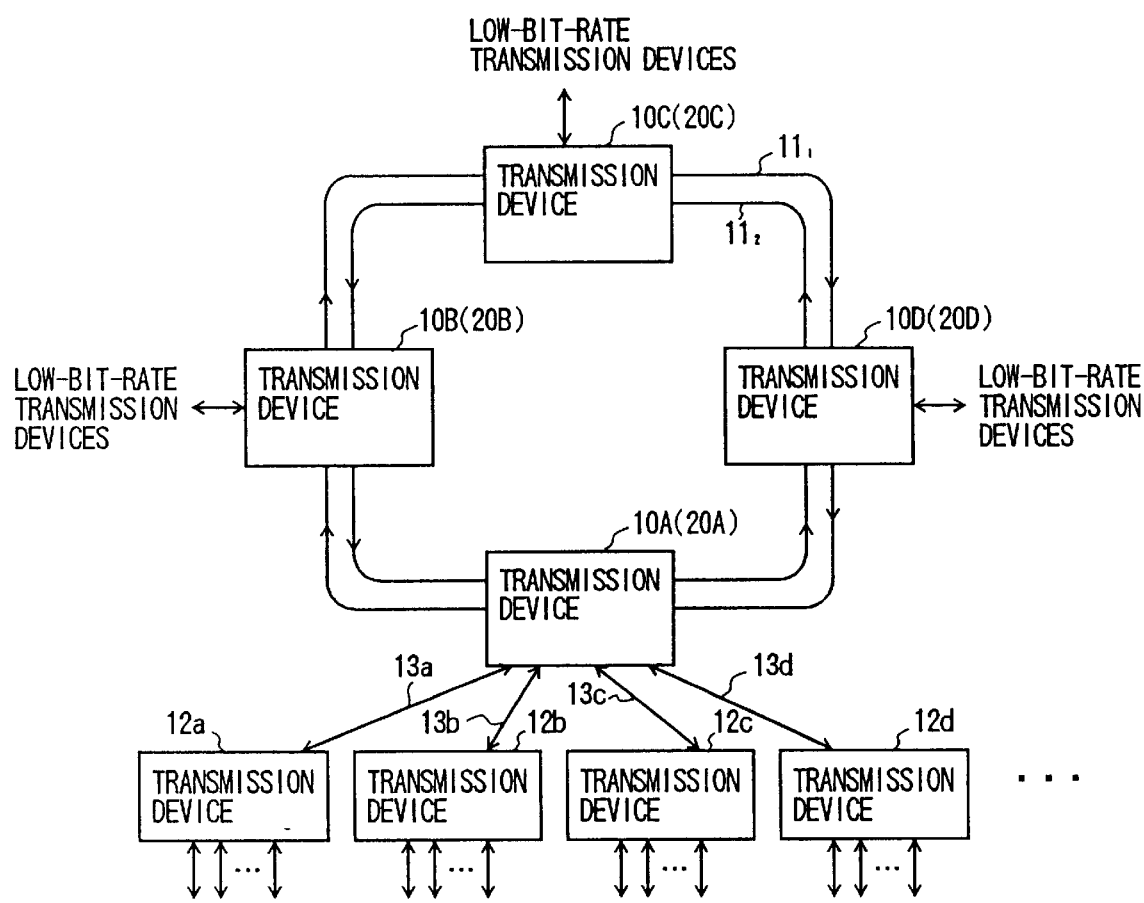
FIG. 4 is a block diagram of a SONET system.
Figure 5:
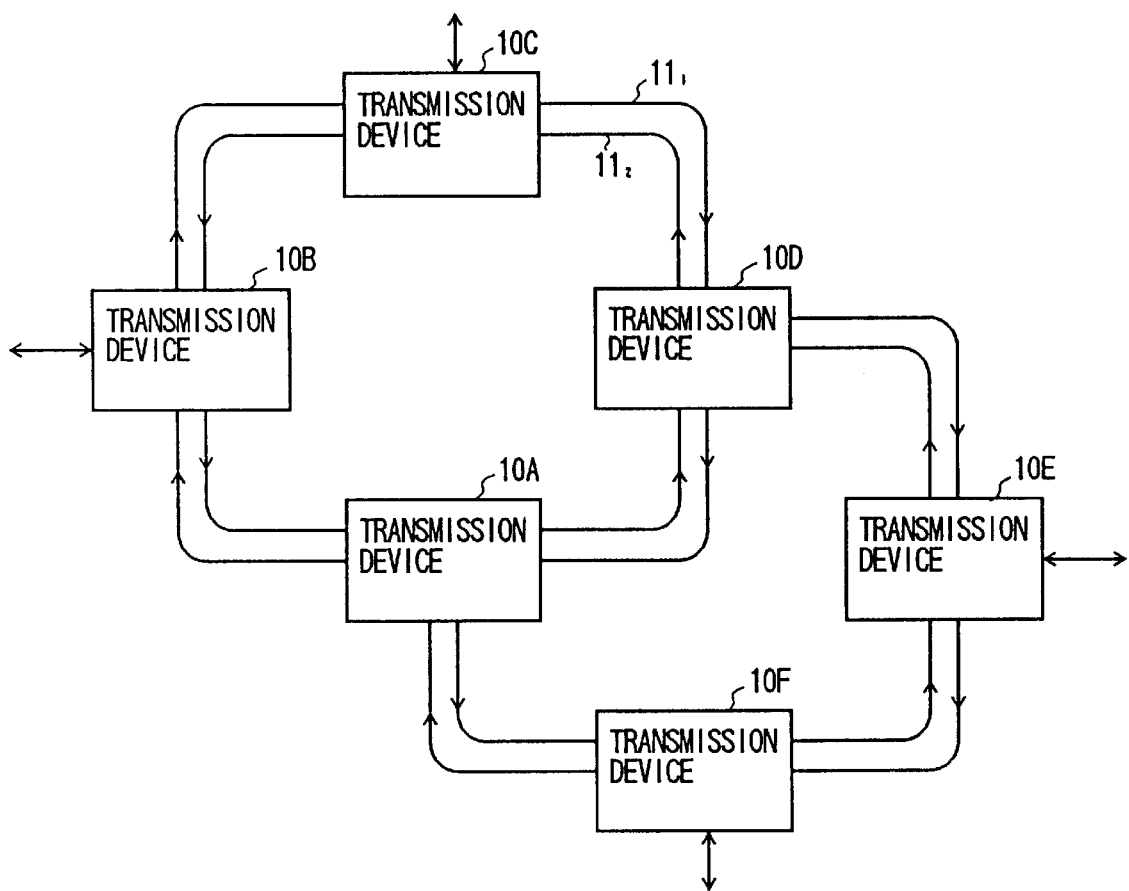
FIG. 5 is a block diagram of another SONET system.
Figure 6:
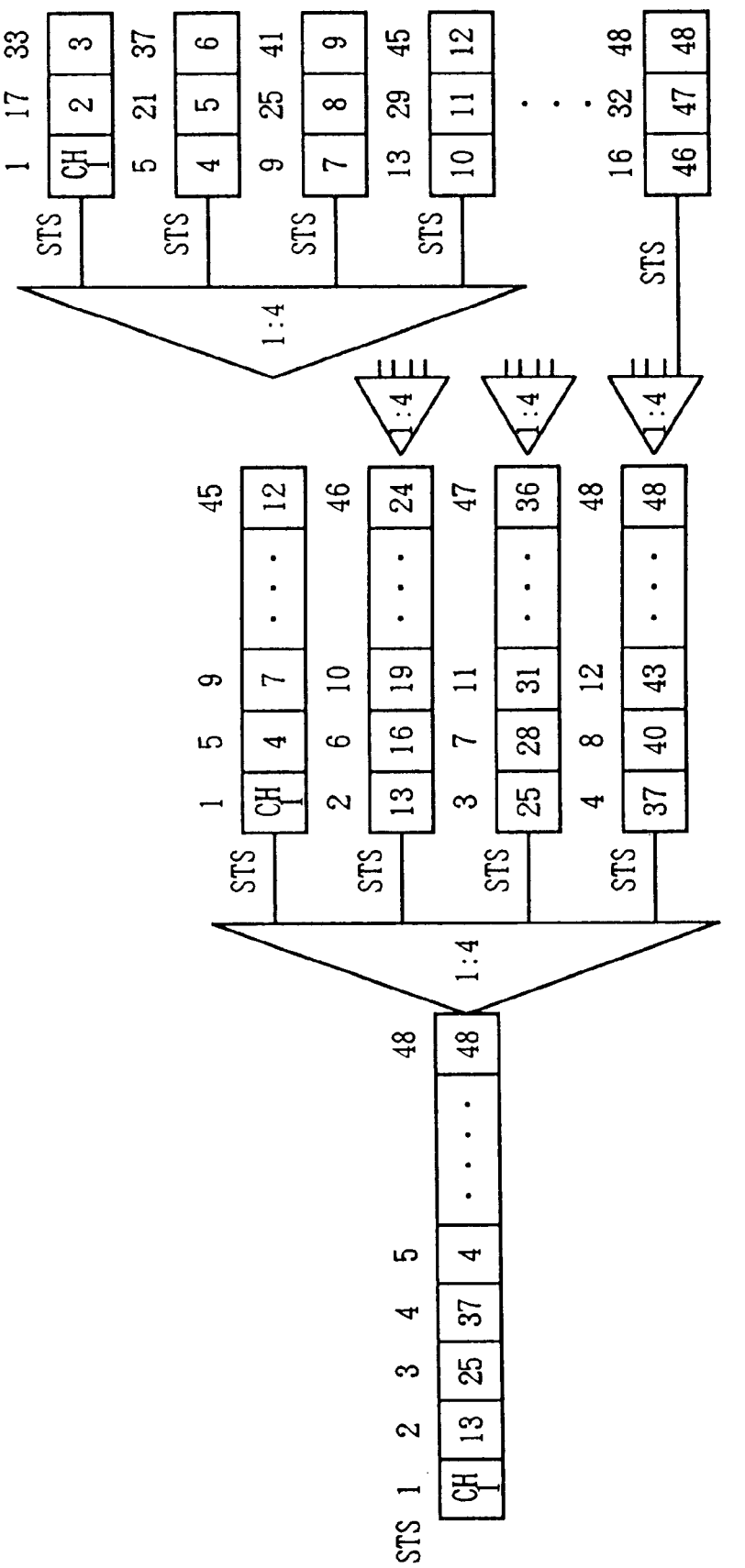
FIG. 6 is a diagram showing a multiplexing hierarchy.
Figure 7:
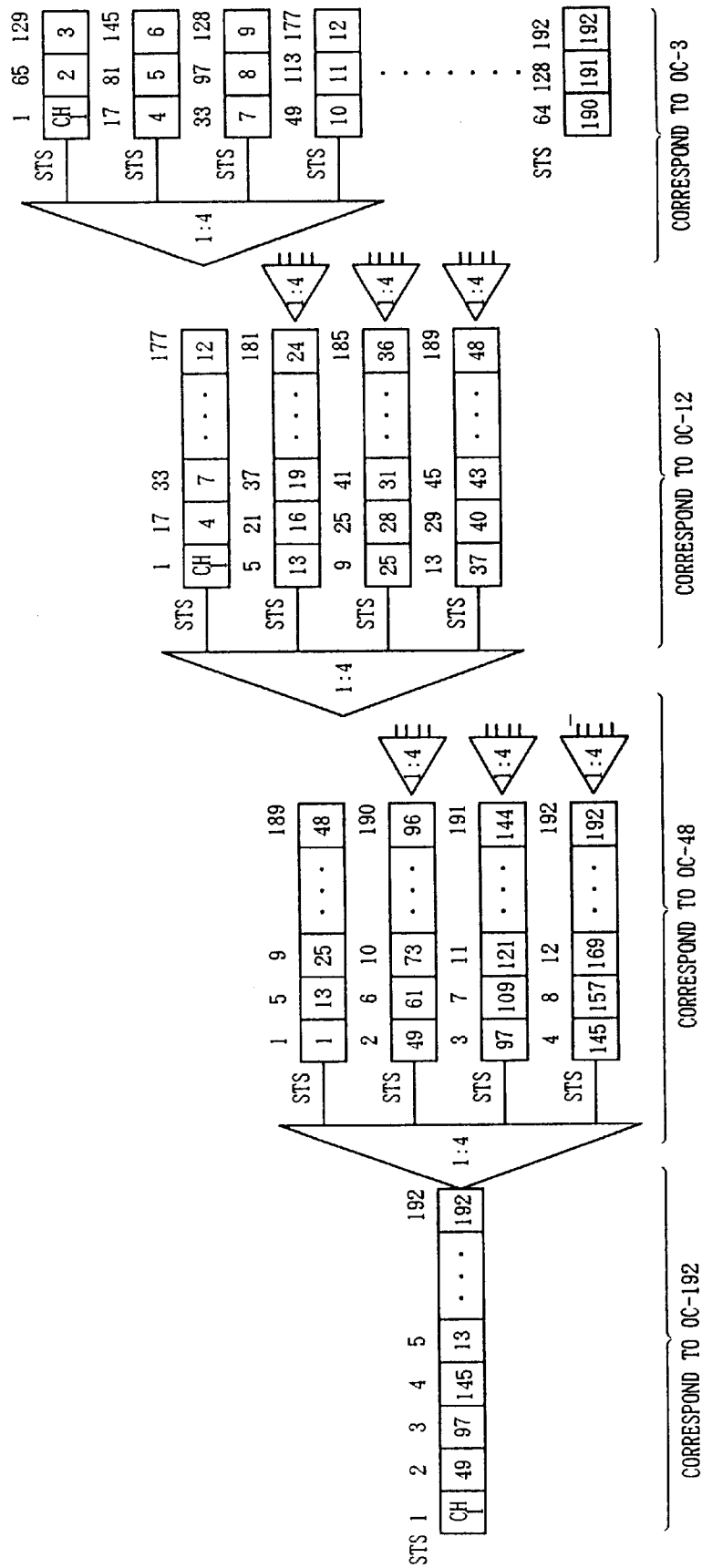
FIG. 7 is a diagram showing another multiplexing hierarchy.

A description will now be given of the operation of the transmission device 20 having the above-mentioned structure. The following description relates to a network as shown in FIG. 4 having four transmission devices, each configured as shown in FIG. 10. The above four transmission devices are assigned reference numbers 20A, 20B, 20C and 20D. The normal operation in which no fault occurs will be described first, and an operation to be carried out when a fault occurs will be described second. Further, a switching of the channel allocation is carried out in response to occurrence of a fault. However, the switching of the channel allocation can be carried out irrespective of whether a fault occurs.

As has been described previously, the transmission device 20 shown in FIG. 10 is designed to specify either the UPSR method or the BLSR method (which will be hereinafter referred to as UPSR transmission mode or BLSR transmission mode) for every unit or for each of the N/n groups. The control part 60 generates UPSR/BLSR indication signals respectively indicating the operation modes of the units of the transmission devices 20A–20D, and send these signals to the microcomputers 50 of the transmission devices 20A–20D via a transmission line 70 shown in FIG. 10. The control part 60 includes a CPU, a memory, and input/output devices such as a display and a keyboard.

Figure 12:
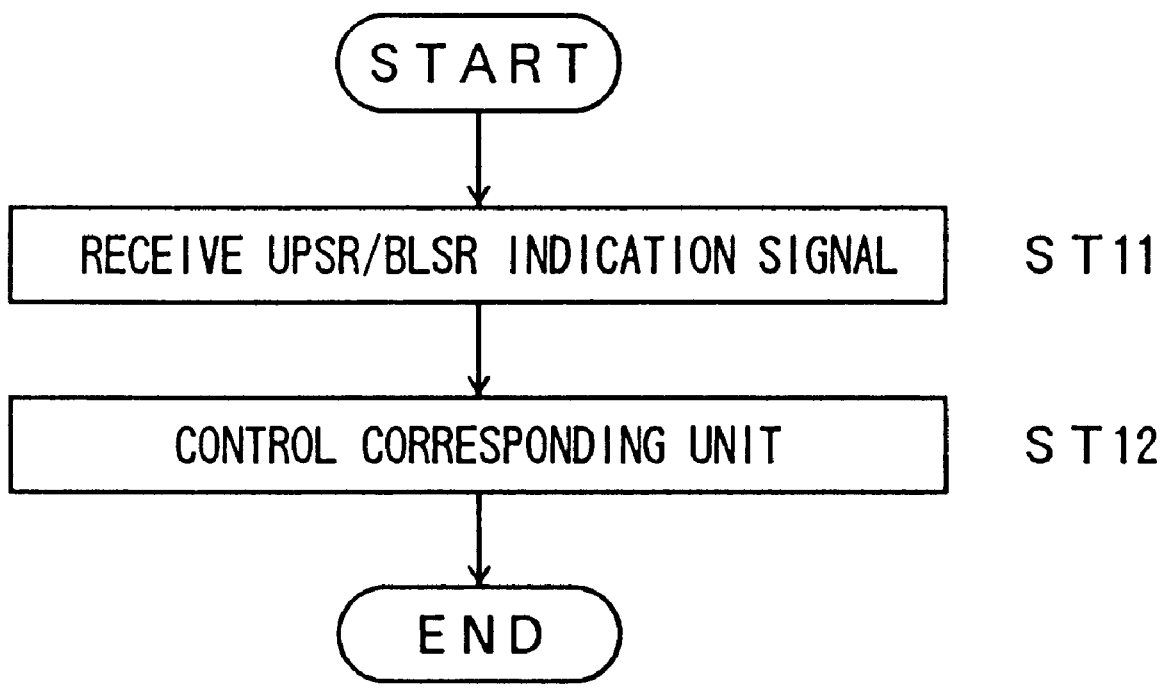
FIG. 12 is a flowchart of an operation of a control part 70 shown in FIG. 10.

FIG. 12 is a flowchart of a mode setting operation executed by the microcomputers 50 respectively provided in the transmission devices 20A–20D. At step ST11, the microcomputer 50 receives the UPSR/BLSR indication signal, which determines the operation mode of each unit. Then, the microcomputer 50 controls the units so as to operate in the specified modes at step S12. For example, if the operation mode of a unit is indicated so that channels #1–#48 shown in FIG. 11 operate in the UPSR transmission mode, the microcomputer 50 controls the unit UT(1-W) f the signal processing part 23 so that the switch parts 26a and 26b and the bridge parts 29a and 29b make connections indicated by solid lines shown in FIG. 10. The unit UT(1-P) of the signal processing part 23 are controlled in the same manner as the unit UT(1-W). Further, the microcomputer 50 controls the unit $40_1$ of the path switch part 40 to select the input on the west side (W) or the input on the east side (E).

As has been described previously, in the UPSR transmission mode, the identical signals are output to both the east and west sides, and thus there is no working/protection channel allocation. Hence, all of 48 channels are working channels, and the identical signals are received from the east and west sides. In practice, one of the two identical signals is handled as the working signal, and the other signal is handled as the protection signal. In FIG. 10, when the transmission device terminates the received signals, the signal from the east side is output to the east-side input of the unit $40_1$ of the path switch part 40 by the extracting part 27a, and the signal from the west side is output to the west-side input thereof. In this case, the extracting part 27b is supplied with the signal from the west side, and the extracting part 37b is supplied with the signal from the east side. These signals pass through the extracting parts 27b and 37b, and are supplied to the multiplexers 34 and 24, respectively. However, the multiplexers 34 and 24 do not select the above signals.

The microcomputer 50 controls the unit $40_1$ of the path switch part 40 to select either the west side or the east side. In this case, a predetermined side can be selected. Alternatively, the side having the better transmission condition (smaller errors) may be selected. The transmission condition can be recognized by referring to given information in the overhead (for example, control information B3 shown in FIG. 3A) in the demultiplexers 22 and 32. It is also possible to monitor the transmission conditions of the east and west sides in the units $40_1$–$40_4$. The signal selected by the unit $40_1$ is output to a low-bit-rate transmission device connected thereto. If the low-bit-rate transmission device has a capability of inputting and outputting a light signal, an electric-optic converting part is provided so as to follow the unit $40_1$. If the low-bit-rate transmission device inputs and outputs electric signals, such a converting part is not required. As has been described previously, the signal from the low-bit-rate transmission device is supplied to the unit $42_1$, and is then output to the inserting parts 28a, 28b, 38a and 38b.

The other units UT(2-W)–UT(4-W) and UT(2-P)–UT(4-P) operates in the same manner as described above.

If it is judged, at step ST11 shown in FIG. 12, that channels #1 through #48 operate in the BLSR transmission mode, the switch parts 26a, 26b, 36a and 36b and the bridge parts 29a, 29b, 39a and 39b make connections as indicated by the solid lines shown in FIG. 10 under the control of the microcomputer 50. In the BLSR transmission mode, the protection channels as much as the working channels are provided. Hence, the signals are sent to the low-bit-rate transmission devices in a manner different from that for the UPSR transmission mode. For example, the extracting part 27a of the unit UT(1-W) of the signal processing part 23 extracts only working channels #1–#24 from the received STS-48(n) signal, and transfers the extracted channels to the east-side input of the unit $40_1$. In this case, working channels #1–#24 are set to channels #1–#24 on the extracting side. The extracting part 27b extracts only working channels #1–#24 from the received STS-48(n) signal, and outputs them to the east-side input of the unit $40_1$. In this case, working channels #1–#24 are set to channels #25–#48 on the extracting side.

The distributing unit $42_1$ of the distributing part 42 outputs the signals sent by low-bit-rate transmission devices to the unit UT(1-W) and the unit UT(1-P). The inserting part 28a of the unit UT(1-W) sets channels #1–#24 among channels #1–#48 of the signal sent by the row-bit-rate transmission device and received via the unit $42_1$ to working channels #1–#24 output to the west side by the time slot assignment process. The inserting part 28b of the unit UT(1-W) sends remaining channels #25–#48 to working channels #1–#24 output to the east side by the time slot assignment process.

The units UT(1-P)–UT(4-P) of the signal processing part 33 of the protection system $20_2$ operate in the same manner as those of the aforementioned working system $20_1$.

The multiplexer 24 multiplexes the signal (working channels #1–#24) from the unit UT(1-W) of the signal processing part 23 and the signal (protection channels #25–#48) from the unit UT(1-P) of the signal processing part 33, and outputs a multiplexed signal to the electric-optical converting unit 25. Similarly, the multiplexer 34 multiplexes the signal (working channels #1–#24) from the unit UT(1-W) of the signal processing part 23 and the signal (protection channels #25–#48) from the unit UT(1-P) of the signal processing part 33, and outputs a multiplexed signal to the electric-optical converting unit 25.

As described above, either the UPSR transmission mode or the BLSR transmission mode can be set to each unit, or each group of channels.

The operation to be performed if a fault occurs in the above normal operation is as follows.

First, a description will be given, with reference to FIG. 13, of the operation of the control part 60 shown in FIG. 10. For example, if the demultiplexer 22 or 32 of any of the transmission devices 20A–20D does not receive a signal at all for a given period, the control part 60 recognizes that a fault such as a braking of an optical fiber cable occurs. More particularly, at step ST21 shown in FIG. 13, the control part 60 repeatedly monitors, via the microcomputer 50, the aforementioned AIS information which will be received at any of the transmission devices 20A–20D if a fault occurs. If it is determined, at step ST21, that any of the transmission devices 20A–20D receives the AIS information, the control part 60 recognizes that a fault occurs in the system. Further, the control part 60 identifies the location at which the fault occurs (for example, a point between the transmission devices 20A and 20B shown in FIG. 4). The control part 60 generates a control signal based on the occurrence of the fault at step ST23, and sends it to the transmission devices 20A–20D via the transmission path 70 at step ST24. The above control signal includes information indicating the transmission devices connected to the optical fiber cable in which the fault occurs.

Figure 13:
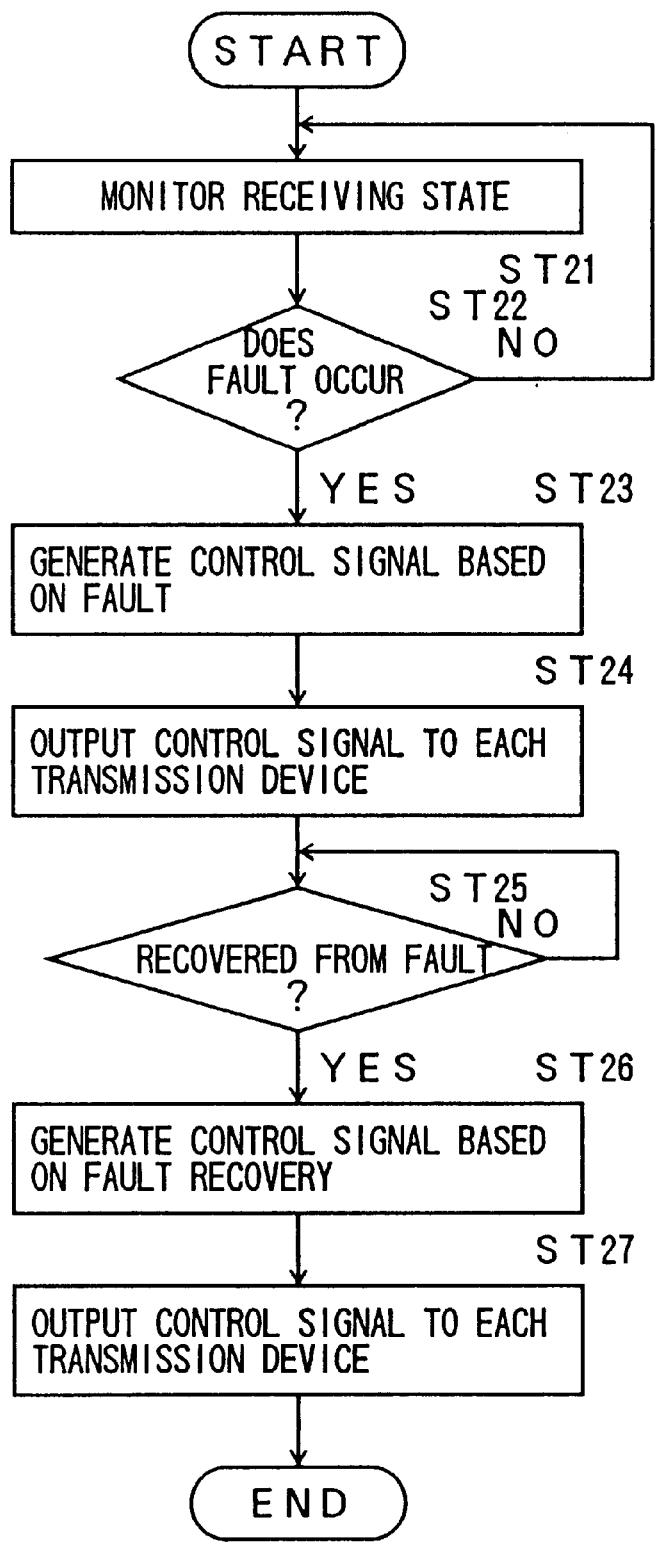
FIG. 13 is a flowchart of another operation of the control part 70.
Figure 14:
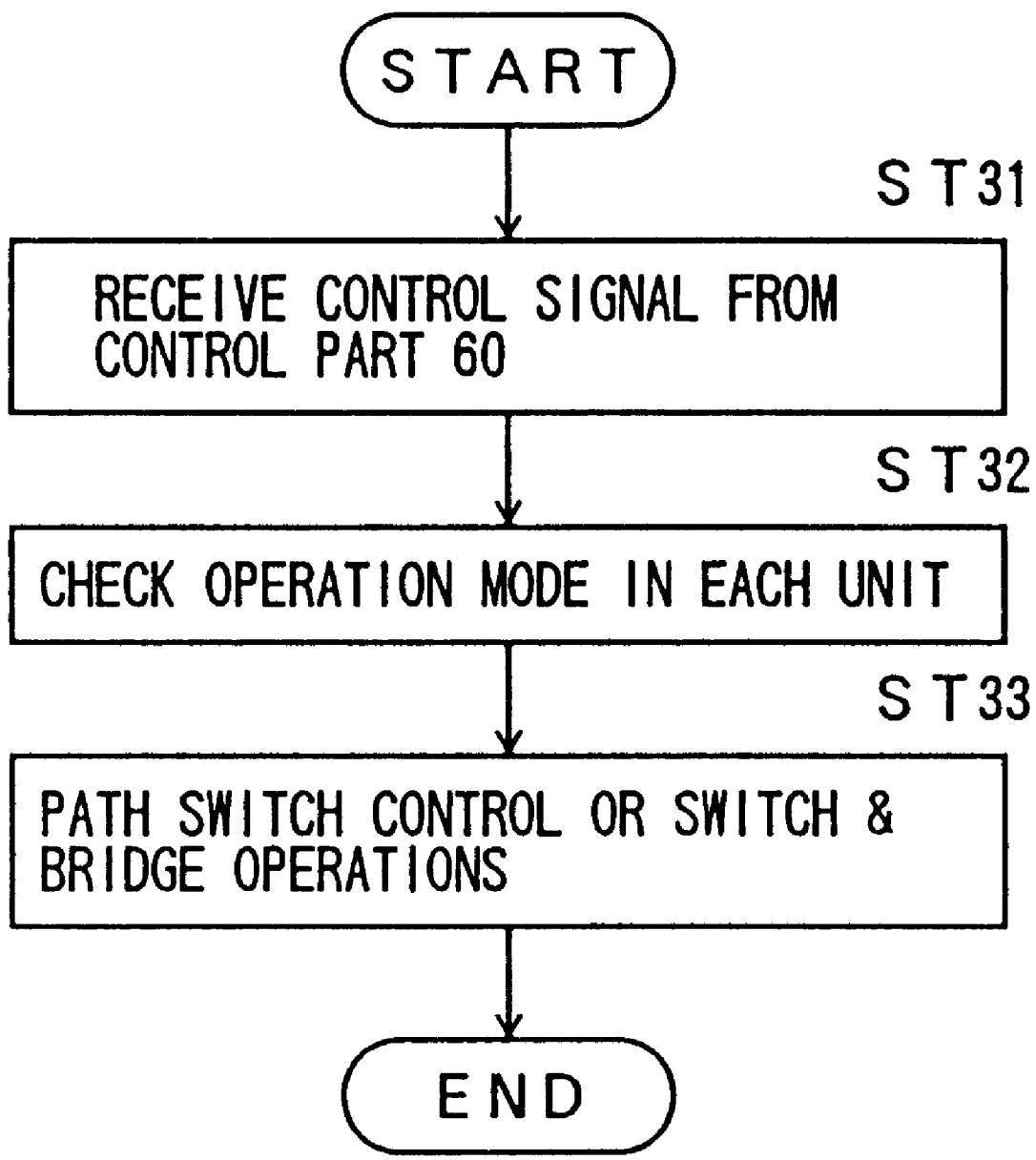
FIG. 14 is a flowchart of an operation of a microcomputer in the transmission device shown in FIG. 10.

FIG. 14 is a flowchart of an operation of the microcomputer 50 provided in each of the transmission devices 20A–20D. The microcomputer 50 receives the control signal output at step ST24 shown in FIG. 13 at step ST31, and checks the operation modes of the units at step ST32. The microcomputer 50 recognizes the relationship between the position of occurrence of the fault and its own transmission device by referring to the operation modes and the control signal from the control part 60. Then, the microcomputer 50 controls the respective units at step ST33.

It will now be assumed that the units UT(1-W) and UT(1-P) of the signal processing parts 23 and 33 shown in FIG. 10 operate in the UPSR transmission mode. The microcomputer 50 identifies the side on which the signal inputting is interrupted due to the occurrence of the fault or an increased amount of error occurs. If the unit $40_1$ of the path switch part 40 selects the defective side, the microcomputer 50 causes the unit $40_1$ to select the other, normal side. For example, if the unit $40_1$ selects the east side at which the fault occurs, the unit $40_1$ is controlled to select the west side. As has been described previously, the identical signals are sent to (received from) the east and west sides in the UPSR transmission mode, the transmission data is not lost due to the occurrence of a fault.

Figure 8:
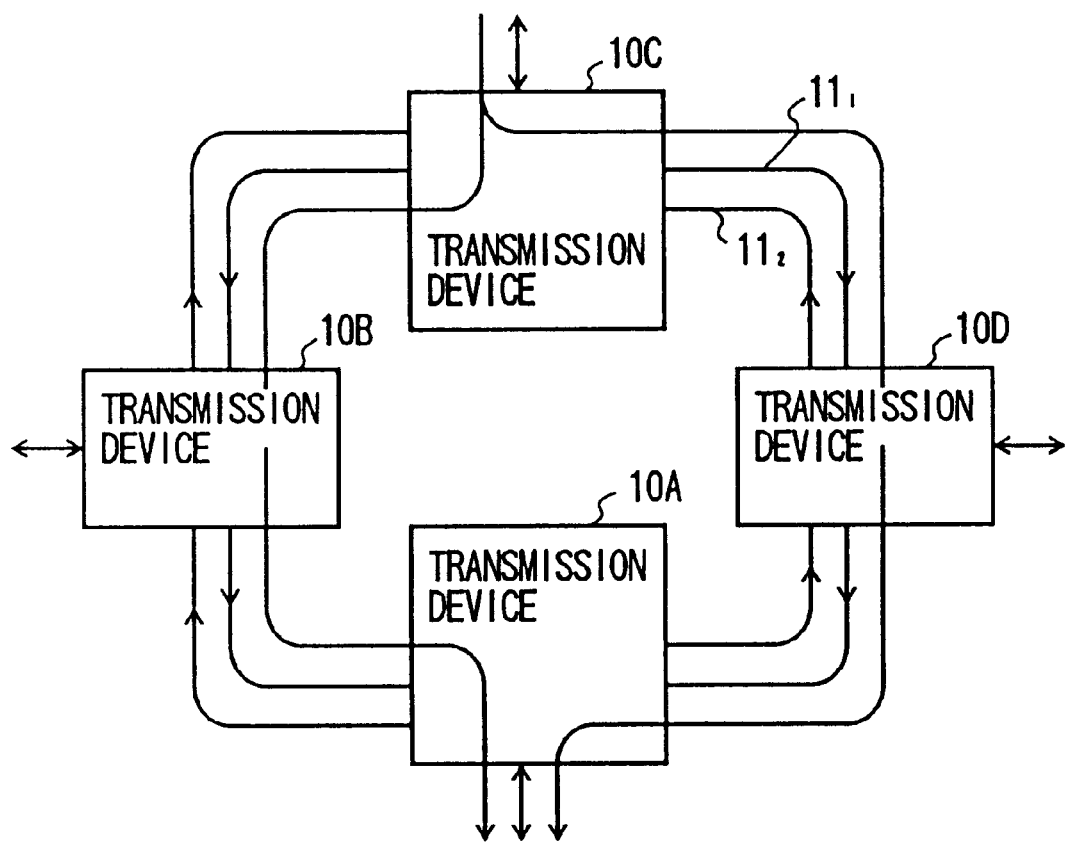
FIG. 8 is a diagram showing a UPSR method.
Figure 9A:
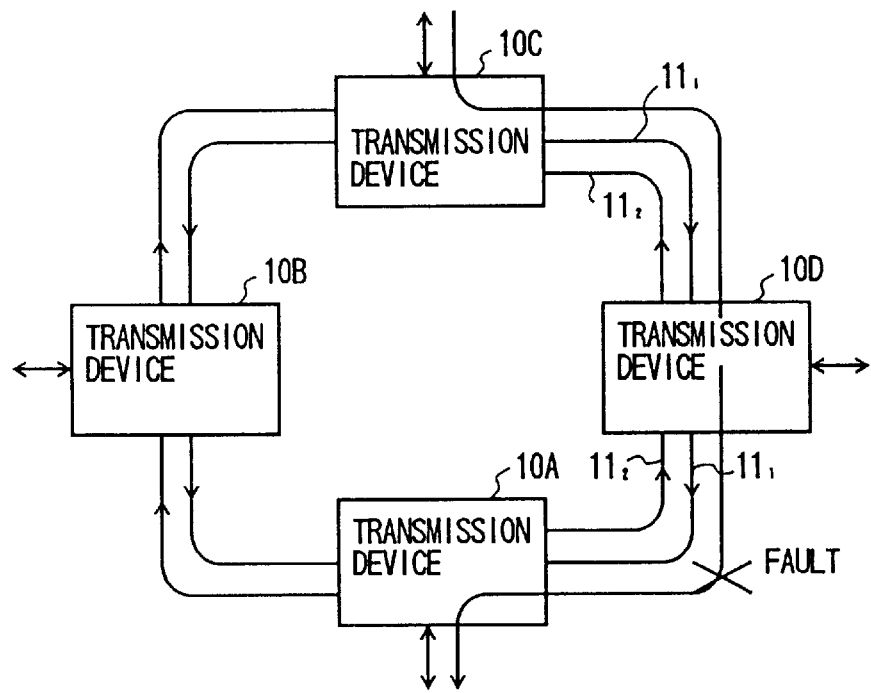
FIGS. 9A and 9B are diagrams showing a BLSR method.
Figure 9B:
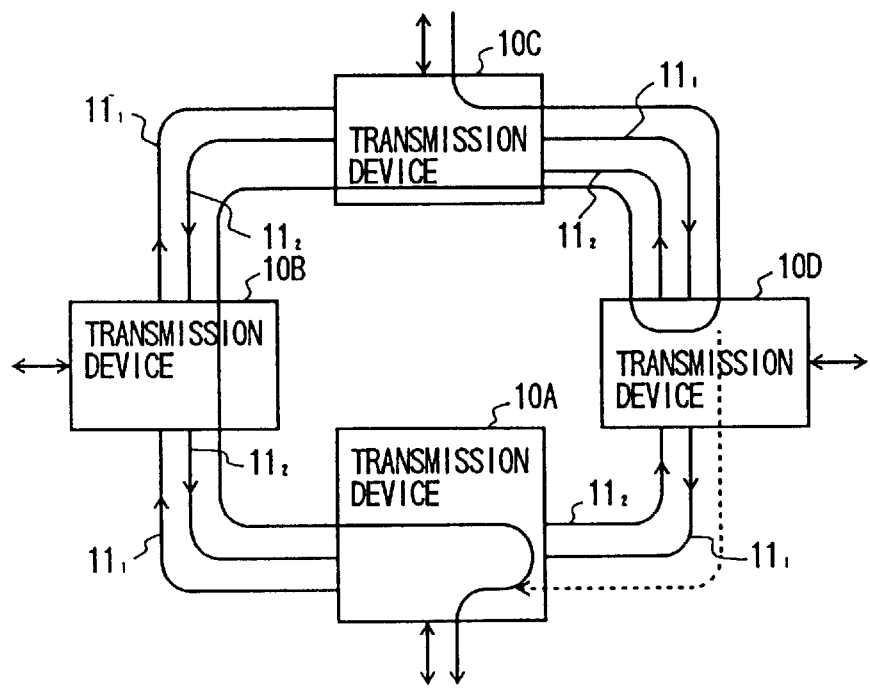

There is a case where the transmission device 10D shown in FIG. 8 allows the received signal to pass therethrough. The microcomputer 50 recognizes that its own transmission device is located like the transmission device 10D by referring to the aforementioned control signal from the control part 60. In this case, no unit control of the path switch part 40 is performed.

Figure 15:
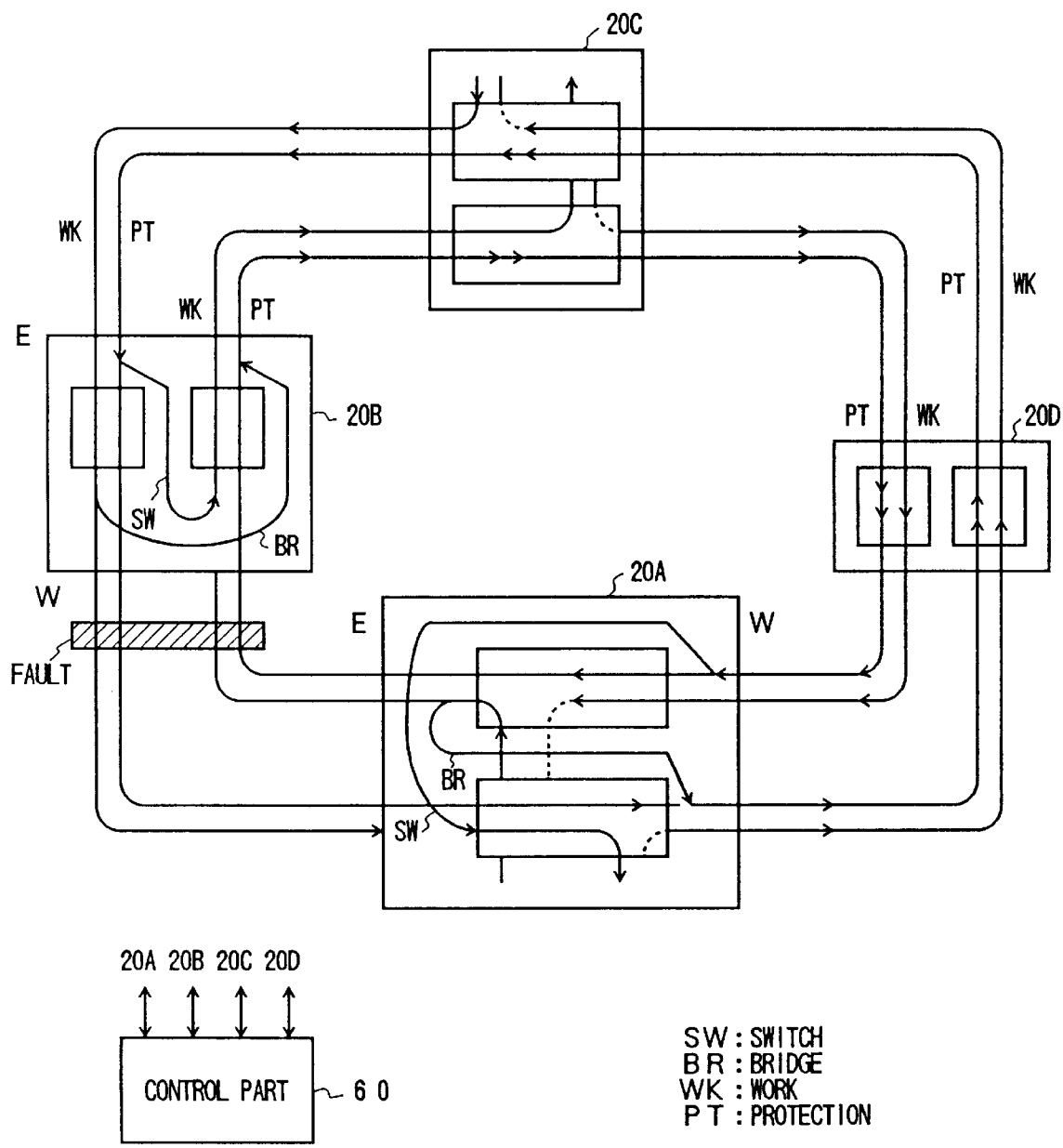
FIG. 15 is a block diagram showing how to avoid, by a BLSR method, a fault which occurs in a network in which transmission devices are connected in a ring formation.

Next, a description will be given, with reference to FIG. 15, of a case where the units UT(1-W) and UT(1-P) of the signal processing parts 23 and 33 operate in the BLSR transmission mode. FIG. 15 shows a case where the transmission devices 20A–20D are connected in a ring formation, and a fault occurs in the optical fiber cables provided between the transmission devices 20A and 20B while the transmission devices 20A and 20C communicate with each other in the two directions. As has been described previously, the control part 60 monitors the states of the transmission devices 20A–20D, and identifies the position in which the fault occurs. Then, the control part 60 sends the control signals to the transmission devices 20A–20D.

When the microcomputer 50 of the transmission device 20B receives the above control signal, the loop-back process is executed therein. That is, the microcomputer 50 of the transmission device 20B controls the units UT(1-W) and UT(1-P) to execute a switch operation SW and a bridge operation BR illustrated in the block of the microcomputer 50 in FIG. 15. More particularly, working channels (WK) #1–#24 which are input to the transmission device 20B from the east side are connected to protection channels #25–#48 sent to the east side. This connecting operation is the bridge operation. Further, protection channels #25–#48 which are input to the transmission device 20B from the east side are connected to working channels #1–#24 sent to the east side. This connecting operation is the switch operation.

When the microcomputer 50 of the transmission device 20A receives the above control signal, the loop-back process is executed therein. That is, the microcomputer 50 of the transmission device 20A controls the units UT(1-W) and UT(1-P) to execute a switch operation SW and a bridge operation BR illustrated in the block of the microcomputer 50 in FIG. 15. In the switch operation SW, protection channels #25–#48 which are input to the transmission device 20A from the west side are connected to working channels #1–#24 input from each side. In the bridge operation BR, working channels #1–#24 output to the east side are connected to protection channels #25–#48 output to the west side.

The transmission devices 20C and 20D are not subjected to the loop-back operation.

Figure 16:
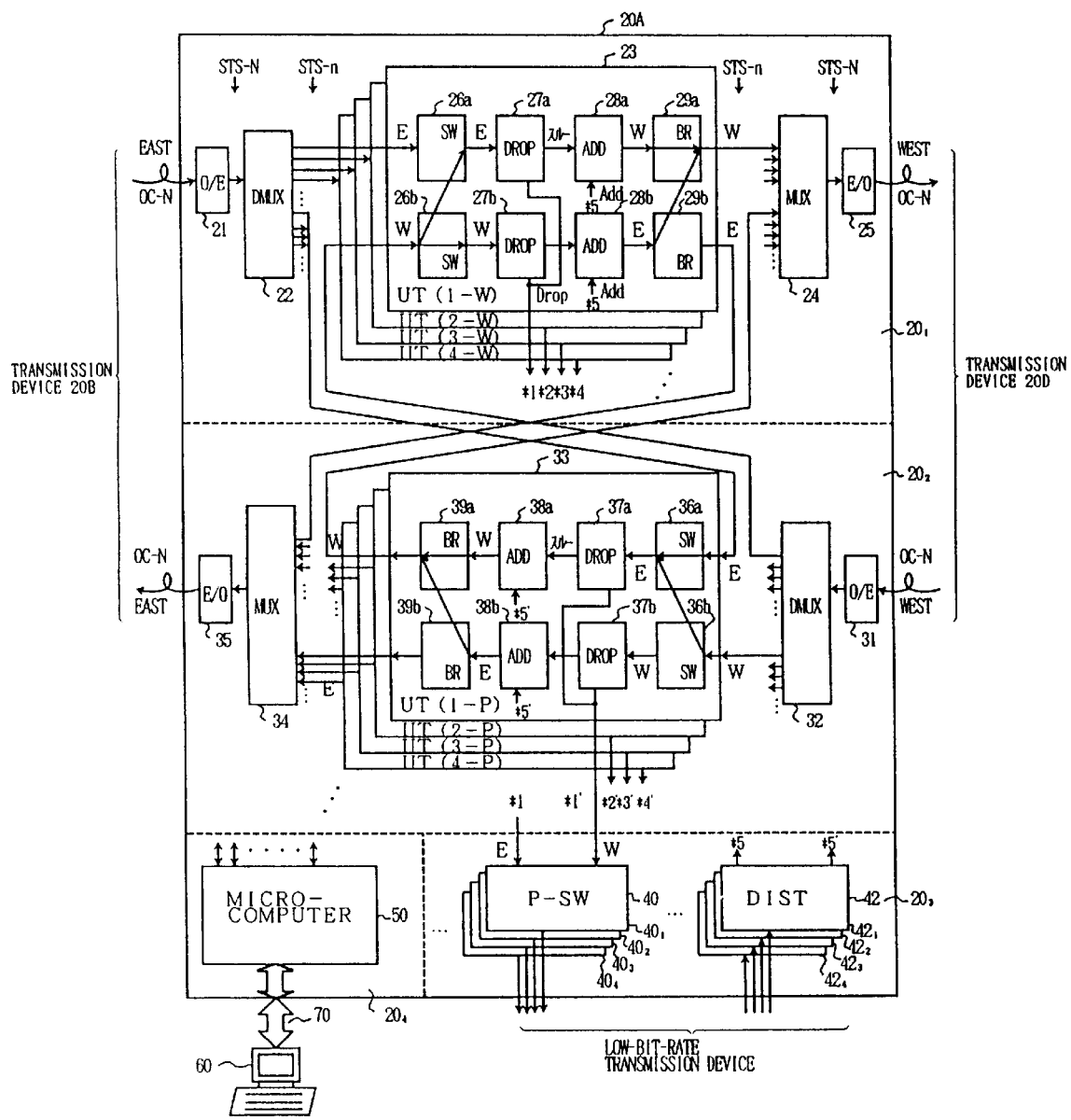
FIG. 16 is a block diagram showing a loop-back operation of a transmission device 20A shown in FIG. 15.

FIG. 16 shows the above-mentioned loop-back operation of the transmission device 20A explained with reference to FIG. 15. Under the control of the microcomputer 50, the switch 26b performs the switch operation to make a route for outputting the west-side input to the extracting part 37a located on the east side. The bridge part 39b performs the bridge operation to make a route for outputting the east-side input to the west-side.

Hence, working channels #1–#24 of the signal which is sent by the low-bit-rate transmission device and is received via the unit $42_1$ in the normal state are set to protection channels #25–#48 in the inserting parts 38a and 38b of the unit UT(1-P) of the signal processing part 33. Protection channels #25–#48 output from the inserting part 38a are set to the west-side output via the bridge part 39a. Further, protection channels #25–#48 output from the inserting part 38b are bridged in the bridge part 39a and are set to the west-side output. Then, protection channels #25–#48 are applied to the multiplexer 24, which outputs a multiplexed signal to the electric-optical converting part 25. Hence, the above protection channels #25–#48 are output to the west-side optical fiber cable as protection channels #25–#48 of the OC-192 light signal. As has been described with reference to FIG. 15, protection channels #25–#48 are switched to working channels #1–#24 in the transmission device 20B, and are then sent to the transmission device 20C.

Protection channels #25–#48 received from the west side (which are those obtained by bridging working channels #1–#24 in the transmission device 20B) pass through the optical-electric converting part 31, the demultiplexer 32, the switch part 26b and the extracting part 27a, and are output to the east-side input of the unit $40_1$ of the path switch part 40. The above-mentioned protection channels #25–#48 pass through the demultiplexer 32, the switch part 36b and the extracting part 37a, and are output to the west-side input of the unit $40_1$. That is, the unit $40_1$ receives two identical signals (redundant structure), and is thus instructed beforehand to select which signal should be selected.

Figure 17:
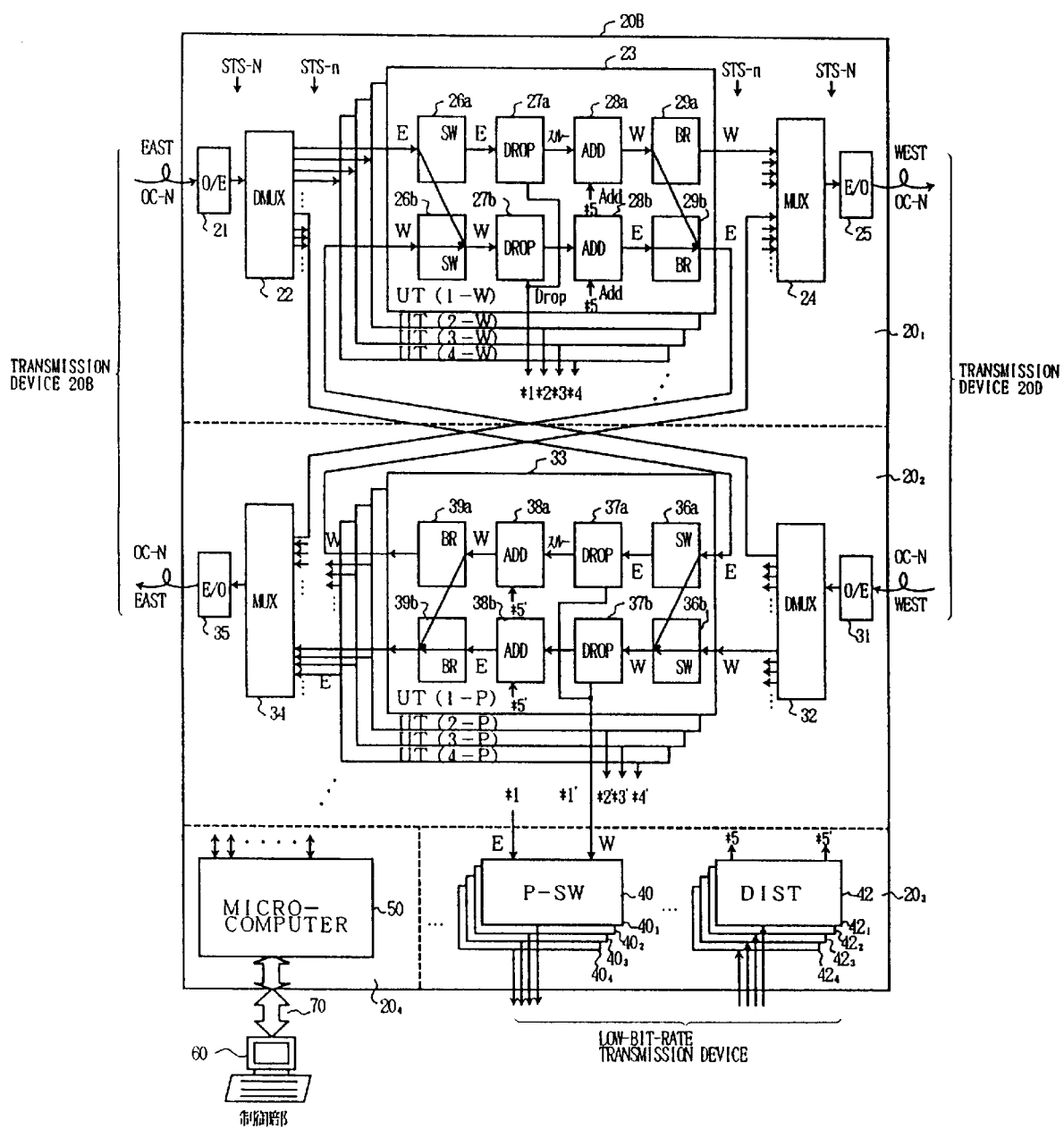
FIG. 17 is a block diagram showing a loop-back operation of a transmission device 20B shown in FIG. 15.

FIG. 17 is a diagram showing the aforementioned loop-back operation of the transmission device 20B shown in FIG. 15. Under the control of the microcomputer 50, the switch 26b performs the switch operation to make a route for outputting the east-side input to the extracting part 27a located on the west side. The bridge part 29b performs the bridge operation to make a route for outputting the west-side input to the east side. Further, under the control of the microcomputer 50, the switch part 36a performs the switch operation to make a route for outputting the east-side input to the extracting part 37b located on the west side. The bridge part 39a performs the bridge operation to make a route for outputting the west-side input to the east side.

Hence, working channels #1–#24 received from the east side are switched by the switch 36a, and pass through the extracting part 37b. Then, working channels #1–#24 are set to protection channels #25–#48 arranged on the east side by the inserting part 38b, and are output to the multiplexer 34. Protection channels #25–#48 received from the east side are switched by the switch 26a, and pass through the extracting part 27b. Then, protection channels #25–#48 are set to working channels #1–#24 by the inserting part 28b, which channels pass through the bridge part 27b and are then output to the multiplexer 34.

Even if a fault occurs between the transmission devices 20A and 20B while the transmission devices 20A and 20C are communicating with each other in the two directions, the transmission devices 20A and 20C perform the loop-back operations in the same manner as described above. Hence, the transmission devices 20A and 20B continues to communicate with each other.

When the fault is eliminated, the result of the determination carried out at step ST25 of the flowchart of the operation of the control part 60 shown in FIG. 13 is YES. In this case, the controller 60 generates, at step ST26, a control signal based on the fault recovery, and sends the control signal to the transmission devices 20A–20D at step ST27. The microcomputer 50 of each of the transmission devices 20A–20D performs the loop-back operation in the same manner as described above, so that the original connections can be obtained.

The above description relates to the case where a fault occurs in both the optical fiber cables provided between the transmission devices 20A and 20B. Even if a fault occurs in one of the optical fiber cables provided between the transmission devices 20A and 20B, such a fault can be avoided by the aforementioned loop-back operation.

In the above description, the control part 60 outputs the control signals to the transmission devices 20A–20D to control the loop-back operation. The present invention is not limited to the above loop-back control, and an alternative can be employed. For example, it is possible for a control device connected to an optical fiber cable in which a fault occurs to send the control signal to both the east and west sides. This alternative will be described with reference to FIG. 18.

Figure 18:
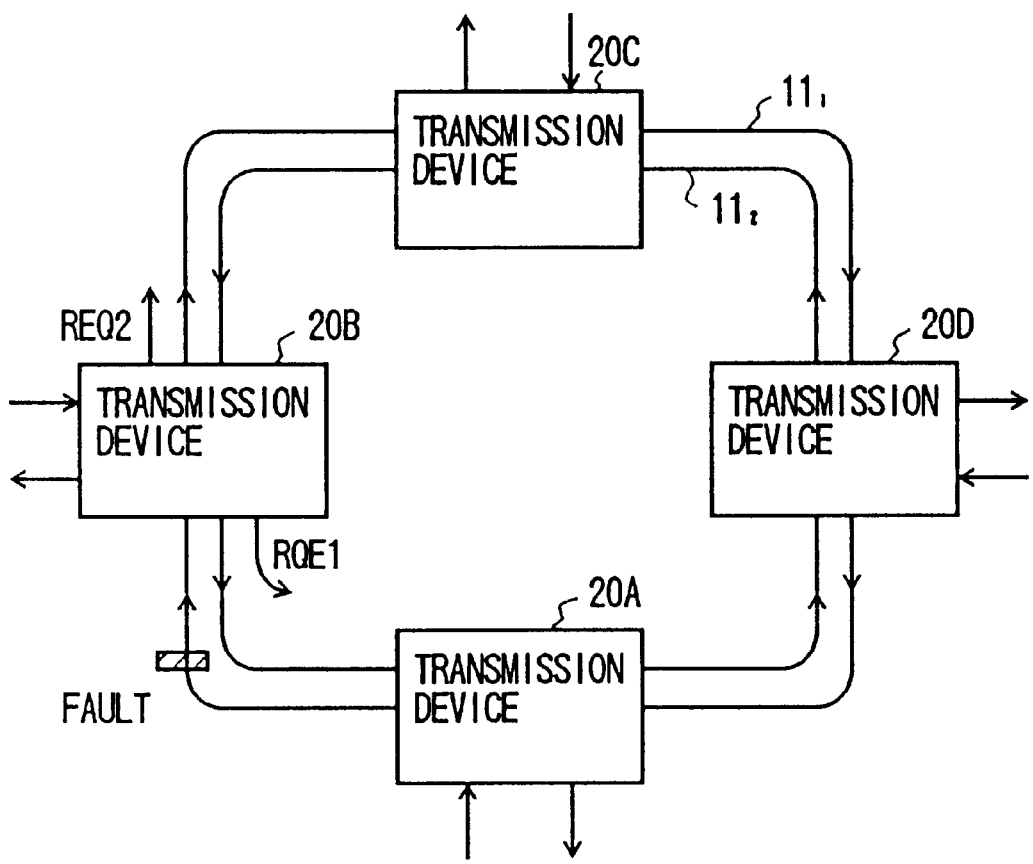
FIG. 18 is a block diagram of a process for informing transmission devices of occurrence of a fault.

The transmission device 20B shown in FIG. 18 recognizes occurrence of a fault when the inputting of the light signal is interrupted. Then, the transmission device 20B sends a loop-back request signal REQ1 to the transmission device 20A, and sends a loop-back request signal REQ2 to the transmission device 20C. The loop-back request signals REQ1 and REQ2 use K1 and K2 bytes shown in FIG. 3A. The microcomputer 50 writes the identification number of its own transmission device 20B into the K1 byte as source information, and writes the identification number of a destination transmission device into the K2 byte as destination information. The K1 and K2 bytes are inserted into the overhead via the corresponding unit of the distributing part 42, for example, the unit $42_1$.

The transmission device 20A receives the request signal REQ1, and then receives the request signal REQ2 which is propagated through a longer route. Thus, the transmission device 20A starts the loop-back operation which has been described with reference to FIG. 16. The transmission device 20B performs the loop-back operation which has been described with reference to FIG. 17 when the request signal REQ1 is propagated through the transmission devices 20A, 20D and 20C and is received. The request signals REQ1 and REQ2 do not include the identification numbers of the transmission devices 20C and 20D, which thus allow the received signal to pass therethrough. According to the above sequence, the loop-back control can automatically be executed without the control part 60.

If a fault occurs in both the optical fiber cables extending in the two directions between the transmission devices 20A and 20B, the transmission devices 20A and 20B output the request signals REQ1 and REQ2, so that the system can be recovered.

As described above, the present invention can employ any loop-back control methods.

In the above-mentioned embodiment of the present invention, either the UPSR transmission mode or the BLSR transmission mode can independently be specified for each of N/n units (groups). However, the present invention is not restricted to the above N/n. For example, the present invention includes a channel dividing arrangement in which the channels are grouped into two groups (in other words, the transmission capacity N is divided by 2), and one of the groups is further grouped into two. In this case, one unit having a transmission capacity N/2, and two units each having a transmission capacity N/4 can be obtained. According to the present invention, it is possible to arbitrarily divide the transmission capacity N (group the channels) taking into consideration of the structure of the hierarchy.

Principally, when N=n, then N groups, each consisting of one channel, are available, and either the UPSR transmission mode or the BLSR transmission mode can be set for each of the N groups.

In the above-mentioned embodiment of the present invention, either the UPSR transmission mode or the BLSR transmission mode can independently be specified for each of N/n units (groups). Alternatively, it is possible to set either the UPSR transmission mode or the BLSR transmission mode to each of the units beforehand. For example, in FIG. 11, channels #1–#48 and #49–#96 are fixed to the UPSR transmission mode, and channels #97–#144 and #145–#192 are fixed to the BLSR transmission mode. The transmission devices can operate in the UPSR and BLSR transmission modes.

The microcomputers 50 of the transmission devices 20A–20D and the control part 60 share the whole control process in a manner different from that described above.

The above description is directed to the SONET system. However, the present invention includes optical communication systems employing other synchronous digital hierarchies, and electrical communication systems in which electric signals are transferred between nodes (transmission devices).

The present invention is not limited to the specifically described embodiments, and variations and modifications can be made without departing from the scope of the present invention.

What is claimed is:

1. A transmission device comprising:
   a channel allocation part which groups channels defined on a transmission line into groups and allocates, for each of the groups, the channels in one of transmission modes which can be defined on a dual link formation of a network to which the transmission device can be connected,
   said channel allocation part including first and second allocation parts respectively carrying out mutually different channel allocation processes,
   one of the first and second allocation parts being set to select one of the transmission modes independently for each of the groups.

2. The transmission device as claimed in claim 1, wherein said channel allocation part comprises channel allocation units respectively provided to N/n groups of the channels where N is a total transmission capacity given by the channels, and n is an integer equal to or less than N.

3. The transmission device as claimed in claim 1, wherein:
   the first allocation part allocates the channels so that identical signals can be sent in two directions; and
   the second allocation part allocates the channels so that signals having a redundant channel arrangement can be sent in two directions.

4. The transmission device as claimed in claim 1, wherein:
   said channel allocation part comprises, for each of the groups, one of first and second allocation parts respectively suitable for the transmission modes; and
   the transmission device comprises a control part which controls said one of the first and second allocation parts to avoid a fault which occurs in the network.

5. The transmission device as claimed in claim 1, wherein:
   a signal transferred over the transmission line is a multiplexed signal obtained by multiplexing N/n signals, where N is a transmission capacity of said signal and each of signals being multiplexed has a capacity n; and
   said channel allocation part comprises channel allocation units respectively provided to N/n groups of the channels.

6. The transmission device as claimed in claim 2, wherein:
   said N corresponds to a level N of a STS-N signal defined in a SONET;
   said n corresponds to a level n of a STS-n signal defined in the SONET;
   said STS-N signal corresponds to said signal transferred over the transmission line; and
   said STS-n signal corresponds to one of said N/n signals.

7. The transmission device as claimed in claim 6, wherein the STS-N signal is a concatenated signal obtained by concatenating a plurality of STS-n signals.

8. A system comprising:
   a plurality of transmission devices connected in a ring formation,
   one of the plurality of transmission devices comprising a channel allocation part which groups channels defined on a transmission line into groups and allocates, for each of the groups, the channels in one of transmission modes which can be defined on a dual link formation of a network to which the transmission device can be connected,
   said channel allocation part including first and second allocation parts respectively carrying out mutually different channel allocation processes,
   one of the first and second allocation parts being set to select one of the transmission modes independently for each of the groups.

9. The system as claimed in claim 8, wherein said channel allocation part comprises channel allocation units respectively provided to N/n groups of channels where N is a total transmission capacity given by the channels, and n is an integer equal to or less than N.

10. The system as claimed in claim 8, wherein:
    the first allocation part allocates the channels so that identical signals can be sent in two directions; and
    the second allocation part allocates the channels so that signals having a redundant channel arrangement can be sent in two directions.

11. The system as claimed in claim 8, wherein:
    said channel allocation part comprises, for each of the groups, one of first and second allocation parts respectively suitable for the transmission modes; and the transmission device comprises a control part which controls said one of the first and second allocation parts to avoid a fault which occurs in the network.

12. The system as claimed in claim 8, wherein:

a signal transferred over the transmission line is a multiplexed signal obtained by multiplexing N/n signals, where N is a transmission capacity of said signal and each of signals being multiplexed has a capacity n; and said channel allocation part comprises channel allocation units respectively to N/n groups of channels.

13. The system as claimed in claim 9, wherein:

said N corresponds to a level N of a STS-N signal defined in a SONET;

said n corresponds to a level n of a STS-n signal defined in the SONET;

said STS-N signal corresponds to said signal transferred over the transmission line; and said STS-n signal corresponds to one of said N/n signals.

14. The system as claimed in claim 13, wherein the STS-N signal is a concatenated signal obtained by concatenating a plurality of STS-n signals.

* * * * *